US007926271B2

(12) United States Patent
Nemeth et al.

(10) Patent No.: US 7,926,271 B2
(45) Date of Patent: *Apr. 19, 2011

(54) FRESH GAS SUPPLY DEVICE FOR A TURBOCHARGED PISTON INTERNAL COMBUSTION ENGINE

(75) Inventors: Huba Nemeth, Budapest (HU); Laszlo Palkovics, Budapest (HU)

(73) Assignee: KNORR-BREMSE Systeme fuer Nutzfahrzeuge, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/844,474

(22) Filed: Aug. 24, 2007

(65) Prior Publication Data

US 2008/0072595 A1 Mar. 27, 2008

Related U.S. Application Data

(63) Continuation of application No. PCT/EP2006/001738, filed on Feb. 24, 2006.

(30) Foreign Application Priority Data

Feb. 24, 2005 (DE) .................. 10 2005 008 405
Oct. 28, 2005 (DE) .................. 10 2005 051 687
Feb. 24, 2006 (DE) .................. 10 2006 008 783

(51) Int. Cl.
F02B 33/44 (2006.01)
(52) U.S. Cl. ..................................... 60/605.1
(58) Field of Classification Search .................. 60/605.1
See application file for complete search history.

(56) References Cited

U.S. PATENT DOCUMENTS

| 3,020,901 | A | * | 2/1962 | Cook .......................... 123/559.1 |
| 3,427,802 | A | * | 2/1969 | Ruoff ............................ 60/605.1 |
| 3,673,796 | A | * | 7/1972 | Weick et al. .................... 60/611 |
| 4,428,227 | A | * | 1/1984 | Yamagata et al. ............. 73/115 |
| 4,445,336 | A | * | 5/1984 | Inoue ........................... 60/605.1 |
| 4,481,773 | A | * | 11/1984 | Sugito et al. .................... 60/606 |
| 4,628,880 | A |   | 12/1986 | Aoyama et al. |
| 5,064,423 | A | * | 11/1991 | Lorenz et al. .................. 60/611 |
| 5,069,036 | A |   | 12/1991 | Schorn et al. |
| 5,718,202 | A |   | 2/1998 | Bentz et al. |

(Continued)

FOREIGN PATENT DOCUMENTS

DE 3737743 A1 * 5/1989

(Continued)

OTHER PUBLICATIONS

International Search Report dated Apr. 26, 2006 with an English translation of the pertinent portions (Six (6) pages).

(Continued)

Primary Examiner — Thomas E Denion
Assistant Examiner — Mary A Davis
(74) Attorney, Agent, or Firm — Crowell & Moring LLP

(57) ABSTRACT

A fresh gas supply device for a turbocharged piston internal combustion engine having fresh gas conduction elements is described. The device includes a compressed air connection operatively connected to a tubular interior chamber of the fresh gas conduction elements, and a quantity regulating device for regulating additional compressed air into the interior chamber. An adjustable flap arranged in the interior chamber is used for regulating a flow from an exhaust gas turbocharger through the interior. The housing of the fresh gas conduction elements forms a separate modular unit defining the first and second end connections also usable as supporting elements for the module.

12 Claims, 6 Drawing Sheets

U.S. PATENT DOCUMENTS

| | | | | |
|---|---|---|---|---|
| 5,819,538 | A * | 10/1998 | Lawson, Jr. | 60/611 |
| 6,006,712 | A * | 12/1999 | Suzuki | 123/184.57 |
| 6,021,764 | A * | 2/2000 | Koyama | 123/563 |
| 6,182,628 | B1 | 2/2001 | Kochs et al. | |
| 6,227,179 | B1 | 5/2001 | Eiermann et al. | |
| 6,446,600 | B1 | 9/2002 | Scherer et al. | |
| 6,644,259 | B2 * | 11/2003 | Storz | 123/184.21 |
| 6,892,699 | B2 * | 5/2005 | Urushiwara | 123/337 |
| 7,007,666 | B2 * | 3/2006 | Kamimura et al. | 123/399 |
| 7,089,911 | B2 * | 8/2006 | Bender et al. | 123/399 |
| 7,343,906 | B2 * | 3/2008 | Ozawa | 123/559.1 |
| 2004/0177838 | A1 | 9/2004 | Veinotte | |
| 2004/0177839 | A1 | 9/2004 | Veinotte | |
| 2008/0042430 | A1 * | 2/2008 | Ichikawa | 285/61 |

FOREIGN PATENT DOCUMENTS

| | | | |
|---|---|---|---|
| DE | 38 41 983 | | 6/1990 |
| DE | 44 43 502 | | 6/1996 |
| DE | 195 07 354 | | 9/1996 |
| DE | 197 28 349 | | 1/1999 |
| DE | 197 81 513 | | 3/1999 |
| DE | 198 40 616 | | 12/1999 |
| DE | 19913157 | A1 * | 10/2000 |
| DE | 199 44 946 | A1 | 3/2001 |
| DE | 699 16 387 | | 5/2004 |
| EP | 0 369 189 | A1 | 5/1990 |
| JP | 02215930 | | 8/1990 |
| JP | 6-299879 | A | 10/1994 |
| JP | 06299879 | A * | 10/1994 |
| JP | 07091267 | A * | 4/1995 |
| WO | WO 2005/064134 | A1 | 7/2005 |

OTHER PUBLICATIONS

Forms PCT/IPEA/416 and PCT/IPEA/409 dated Apr. 2005 with an English translation of the pertinent portions (Sixteen (16) pages).

Form PCT/IB/338 and Form PCT/IPEA/409 (Six (6) pages).

German Office Action dated Jul. 30, 2008 together with an English translation.

Fluidtechnik von A bis Z, Vereinigte Fachverlage, 1989, pp. 72 and 73.

* cited by examiner

FRESH GAS SUPPLY DEVICE FOR A TURBOCHARGED PISTON INTERNAL COMBUSTION ENGINE

CROSS REFERENCE TO RELATED APPLICATIONS

This application is a continuation of PCT International Application No. PCT/EP2006/001738, filed Feb. 24, 2006, which claims priority under 35 U.S.C. §119 to German Patent Application No. 10 2005 008 405.2 filed Feb. 24, 2005 and German Patent Application No. 10 2005 051 687.4 filed Oct. 28, 2005, the entire disclosures of which are herein expressly incorporated by reference.

BACKGROUND AND SUMMARY OF THE INVENTION

The present invention relates to a fresh gas supply device for a turbocharged piston internal combustion engine having fresh gas conduction elements. The device includes a compressed air connection which opens laterally into a tubular interior chamber and has a quantity regulating device, and an adjustable flap which is likewise arranged in the interior chamber and has the purpose of regulating the throughflow. The interior chamber may be bounded by a first end connection for receiving an inflow of charge air from an exhaust gas turbocharger to flow in, and a second end connection for flowing out the charge air from the exhaust gas turbocharger.

The fresh gas supply devices according to embodiments of the invention may be used to support exhaust gas turbochargers. The connected exhaust gas turbocharger cannot at times provide the necessary charge pressure, in particular in the lower rotational speed range of a turbocharged piston internal combustion engine, due to a lack of sufficient drive energy provided by exhaust gases. These circumstances are perceptible to a driver when accelerating out of a low rotational speed, for example when the vehicle starts from low speed or stopped, causing what is known as the so-called turbo deadpoint effect. In order to compensate for the turbo deadpoint effect, additional compressed air may be input into the intake manifold of the piston internal combustion engine from a compressed air supply of the motor vehicle, as necessary. In particular, many types of motor vehicle, such as utility or commercial vehicles or buses, have a compressed air network from which, for example, the pneumatic brake system is supplied.

International Patent Document WO 2005/064134 A1 discloses a generic fresh gas supply device for a turbocharged piston internal combustion engine. The charge air which is compressed by using an exhaust gas turbocharger passes into the cylinder space via an intake manifold. Furthermore, a compressed air line which is opened or closed by using a valve under electronic control opens laterally into the intake manifold. In order to compensate for the turbo deadpoint effect, the valve is opened so that the external compressed air, which is taken from the compressed air accumulator of the compressed air system, passes into the suction space. In order to prevent this additionally input compressed air from flowing back, a forcibly activated non-return valve is arranged in the intake manifold upstream of the turbocharger.

The additional fresh gas conduction devices according to this technical solution are an integral component of the fresh gas supply device and are configured on an engine-specific basis. Accordingly, when repairs are carried out it is thus necessary to exchange relatively large units. Designing variants with and without fresh gas conduction devices in a series of turbocharged piston internal combustion engines is also correspondingly more complex.

The exemplary embodiments of the present invention provide a fresh gas supply device for turbocharged internal combustion engines which can optionally be equipped with fresh gas conduction devices, and which can be used universally in turbocharged internal combustion engines.

The embodiments of the invention include utilizing fresh gas conduction elements which include a separate module, on whose housing the two end connections are located, for example in the form of line connections which are in addition also suitable as supporting elements for the module.

An advantage of the solution according to the exemplary embodiments of the invention is that turbocharged piston internal combustion engines can easily optionally be equipped with it. This is because the separate module can be coupled to the charge air duct when necessary. This also provides the possibility of retrofitting relatively old turbocharged piston internal combustion engines without providing any additional fresh gas conduction elements. Thanks to the modular design, it is possible to make available completely different fresh gas conduction elements which are respectively matched to assigned piston internal combustion engines. As a result, it is possible to adapt parameters, such as the flow rate of additional compressed air, the effective diameter at the valve and the like, to the corresponding piston internal combustion engine in a flexible way.

The two exemplary line connections may preferably be disposed on the housing of the module in the manner of a hose connection, in order to attach hose lines thereto using clip means or the like. In addition it is also possible to embody both line connections, in the manner of a pipe connection in order to attach pipelines thereto using pipe sleeves.

As an alternative to the two exemplary embodiments described above, it is also envisioned to embody at least one of the two line connections in the manner of a flange, in order to permit attachment using screws. The flange may preferably be arranged on the engine so that the module can be attached in a stable fashion to the piston internal combustion engine by using the flange.

In an exemplary embodiment, a quantity regulating device for actuating the flap for controlling the additional compressed air supply, an electromechanical adjustment device for the flap for actively controlling the position of the flap and a position determining device which is assigned thereto, are preferably installed within the housing of the module. These elements which are associated with the fresh gas conduction elements can be integrated into the housing in an installation-space-saving fashion. In addition to the compressed air ports, at least one electrical terminal for the electronic control unit, which may be likewise integrated in the housing, is also arranged on the outside of the housing. The electronic control unit can be connected to the operating voltage and, for example, a CAN bus of the vehicle electronic system via the electrical terminal.

According to a further exemplary embodiment according to the invention, the housing of the module is preferably formed in two parts. The integrated electronic control unit can preferably be arranged under a cover so as to be accessible from the outside in order, for example, to facilitate repair and maintenance.

An exemplary pressure pickup or sensor, whose pressure meter is arranged in the tubular interior chamber between the flap and the first end connection, may be preferably arranged on the electronic control unit. A further connection, via which a second pressure pickup is arranged in the tubular interior chamber between the flap and the second end connection, may also be connected. According to one exemplary embodiment of the invention, the pressure measured values which are acquired in this way are evaluated directly in the electronic control unit which, for this purpose, may include a computer in the form of a microprocessor which operates with corresponding operational and functional software. In another embodiment, it is also possible for the electronic control unit not to be equipped with such a computer and to contain just one power electronic system for actuating the quantity regulating device and the adjustment device. The rest of the control functions can in this case be carried out by using an external engine/vehicle electronic system in a decentralized fashion. Thus a distributed computing system as well as a dedicated computer may be used to perform control functions.

According to another exemplary embodiment of the invention, there is provision for an exchangeable, flow-influencing throttle to be installed in the compressed air line to the quantity regulating device. By selecting the throttle, for example by varying its position, it is possible to easily influence the flow parameter of the quantity regulating device.

Other objects, advantages and novel features of the present invention will become apparent from the following detailed description of the invention when considered in conjunction with the accompanying drawings.

BRIEF DESCRIPTION OF THE DRAWINGS

Further exemplary embodiments of the invention are presented in more detail below together with the description of preferred exemplary embodiments of the invention by referring to the figures, in which.

DETAILED DESCRIPTION OF THE DRAWINGS

Figure 1:
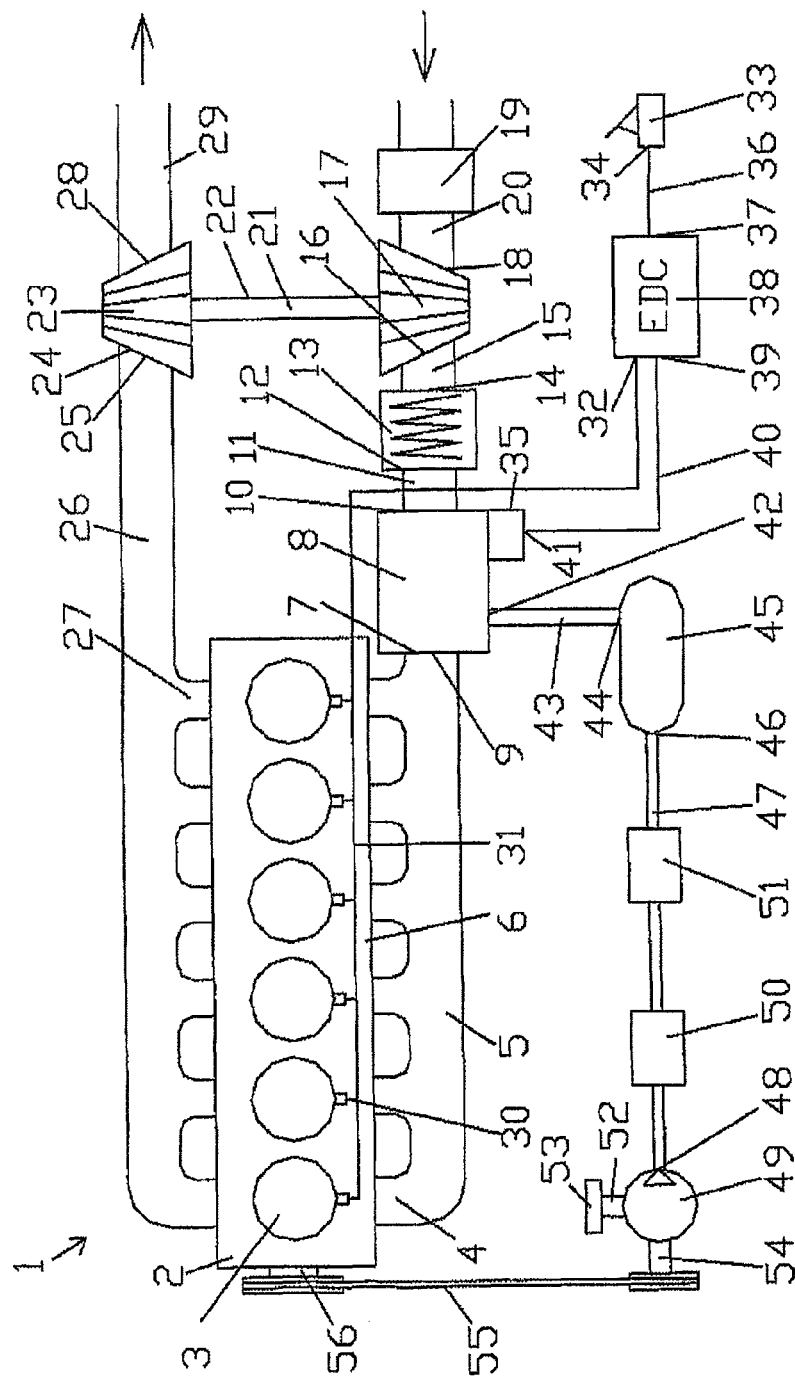
FIG. 1 shows a block circuit diagram of a turbocharged piston internal combustion engine with a fresh gas supply device.

According to the exemplary embodiment shown in FIG. 1, an arrangement 1 includes a turbocharged piston internal combustion engine 2 with six cylinders 3 in series, the intake lines 4 of which are connected to a collecting line or manifold 5 which has a connecting flange 7, to which a fresh gas conduction section module 8 is connected by its second end outflow connection 9. The first end inflow connection 10 is coupled by a line 11 to the outflow opening 12 of the charge air cooler 13, whose inflow opening 14 in turn is coupled by a line 15 to the outflow opening 16 of the turbocompressor 17. An exemplary air filter 19 may be connected to the inflow opening 18 of the turbocompressor 17 using the line 20. The exemplary turbocompressor 17 forms part of the exhaust gas turbocharger 22, whose exhaust gas turbine 23 is connected by its inflow opening 24 to the outflow opening 25 of the exhaust collecting pipe 26. The turbocompressor 17 and the exhaust gas turbine 23 are attached to the shaft 21. The cylinders 3 are connected to the exhaust collecting pipe 26 by means of exhaust lines 27. The outflow opening 28 of the exhaust gas turbine 23 is coupled to the exhaust pipe 29. Those of skill in the art will understand that different numbers and configurations of cylinders may be used according to the invention. Multiple turbochargers, superchargers and/or other forced induction systems may also be employed as part of the turbocharged engine.

In this example, the fuel supply of the cylinders 3 may be provided by the injection nozzles 30 which are controlled by the line 31 from the first terminal 32 of the electronic control unit 38. The connection 34 of an accelerator pedal 33 may be connected by the line 36 to the terminal 37 of the electronic control unit 38. The exemplary accelerator pedal 33 is provided with an activation element which is activated by the driver of the motor vehicle in a conventional manner. The electrical/electronic terminal 39 of the electronic control unit 38 may be coupled by the collecting line 40 to the electrical/electronic terminal 41 of the electronic control unit 35 of the fresh gas conduction section module 8.

The exemplary fresh gas conduction section module 8 has a compressed air connection 42 which is connected by the line 43 to the outlet connection 44 of the compressed air vessel 45. The feed connection 46 of the exemplary compressed air vessel 45 is connected by the line 47 to the compressed air connection 48 of the compressed air compressor 49. Pressure regulators 50 and air dryers 51 may be installed in the line 47. The compressed air compressor 49 has an intake connector 52 which is provided with an air filter 53. The shaft 54 of the compressed air compressor 49 may be connected by a belt drive 55 to the main shaft 56 of the turbocharged diesel engine of the motor vehicle. Alternatively, other methods of actuating the compressor 49 may be used. Compressed air may also be supplied from storage tanks or other sources, according to the invention.

Figure 2:
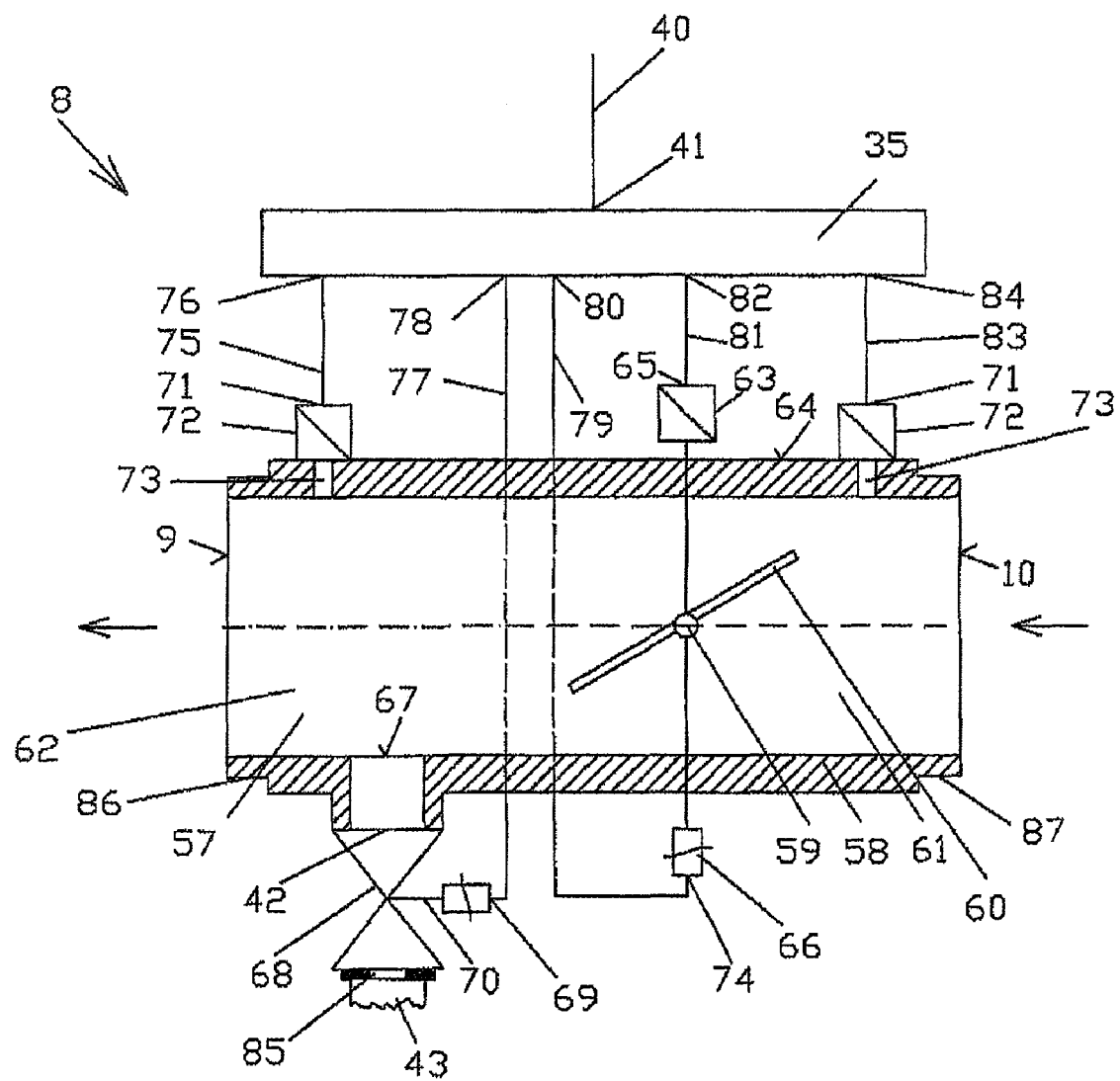
FIG. 2 shows a block circuit diagram of the fresh gas conduction element, embodied as a module, of the fresh gas supply device.

FIG. 2 shows a detailed illustration of the module 8 which in this exemplary embodiment includes of a pipe, and has the first end connection 10 and the second end connection 9. Between the two ends there is an exemplary interior chamber 57 which may have a circular cross section whose diameter is D. The flow diameter for commercial vehicle engines and bus engines can be calculated with the following empirical formula:

$$D[mm] = 11 \cdot V[l]^{0.5} \cdot p[bar]^{0.5} + 35,$$

V being the cubic capacity in liters, and p being the maximum absolute charge pressure in bar. The cubic capacity is specified for a series of engines. The power groups are then typically indicated by using the charge pressure setting. The diameter which is used for a series of engines and is given by the maximum charge pressure determines the preferably selected module size which can then cover the entire series of engines. The interior chamber 57 may be expediently surrounded by the wall 58, in which the shaft 59 of a flap 60 may be mounted and led through. The exemplary flap 60 divides the interior 57 into two parts, specifically the inflow space 61, which is produced between the first end connection 10 and the flap 60, and the outflow space 62 which is produced between the second end connection 9 and the flap 60.

The exemplary flap 60 may have a closed end position and a fully opened end position as well as any desired intermediate positions which are set by rotating the shaft 59. The adjustment device 66 for the flap 60 is embodied in this exemplary embodiment as an electric motor, and is equipped with an electrical adjustment device terminal 74 which is connected by a line 79 to the first terminal 80 of the electronic control unit 35. The adjustment device terminal 74 provides the adjustment device 66 with current. A signal relating to the position of the flap 60 may be obtained from the terminal 65 of the position determining sensor 63; the terminal 65 is in turn connected by a line 81 to the terminal 82 of the electronic control unit 35 of the module 8.

Furthermore, according to an embodiment of the invention, a compressed air inflow opening 67 may be formed between the second end connection 9 and the flap 60 in the wall 58. The exemplary additional compressed air connection 42, which may be equipped with a quantity regulating device 68, may be connected to said compressed air inflow opening 67. The quantity regulating device 68 has a completely blocked position also, to shut off supply of the additional compressed air. The electrical control terminal 69 of the quantity regulating device 68 which has a valve 70 may be connected to the terminal 78 of the electronic control unit 35 of the module 8 by the line 77.

The connection 71 of the pressure pickup 72, which is attached to the wall 58, is coupled by the line 75 to the connection 76 of the electronic control unit 35. The pressure meter 73 of the pressure pickup 72 may be plugged into the outflow space 62 of the fresh gas conduction section module 8. A similar connection 71 of the pressure pickup 72, which is attached to the wall 58, may be coupled by the line 83 to the connection 84 of the module 35. The pressure meter 73 of the pressure pickup 72 may be plugged into the inflow space 61 of the module 8.

The exemplary electronic control unit 35 of the module 8 is provided with a terminal 41 to which the collecting line 40 is connected. The collecting line 40 is embodied as a communications line which is coupled to an engine electronic system (not illustrated) which comprises, for example a central control unit (ECU) which is provided with corresponding software.

The fresh gas line section module 8 according to embodiments of the invention is provided at both ends with line connections 86 and 87 which are suitable for seal-forming installation in the line 11 by which the fresh gas supply of the turbocharged diesel engine is provided. The line connections 86 and 87 are embodied in such a way that they are suitable for attaching the fresh gas line section module 8. The module 8 thus forms a self contained, unitary element containing the components necessary to effect blowing in of additional compressed air, when necessary, and that can be connected easily to different engines.

The exemplary quantity regulating device 68 has an exchangeable throttle 85 at the inflow opening, as a result of which the throughflow quantity may be limited and/or adapted to the engine size in a modular fashion.

Figure 3:
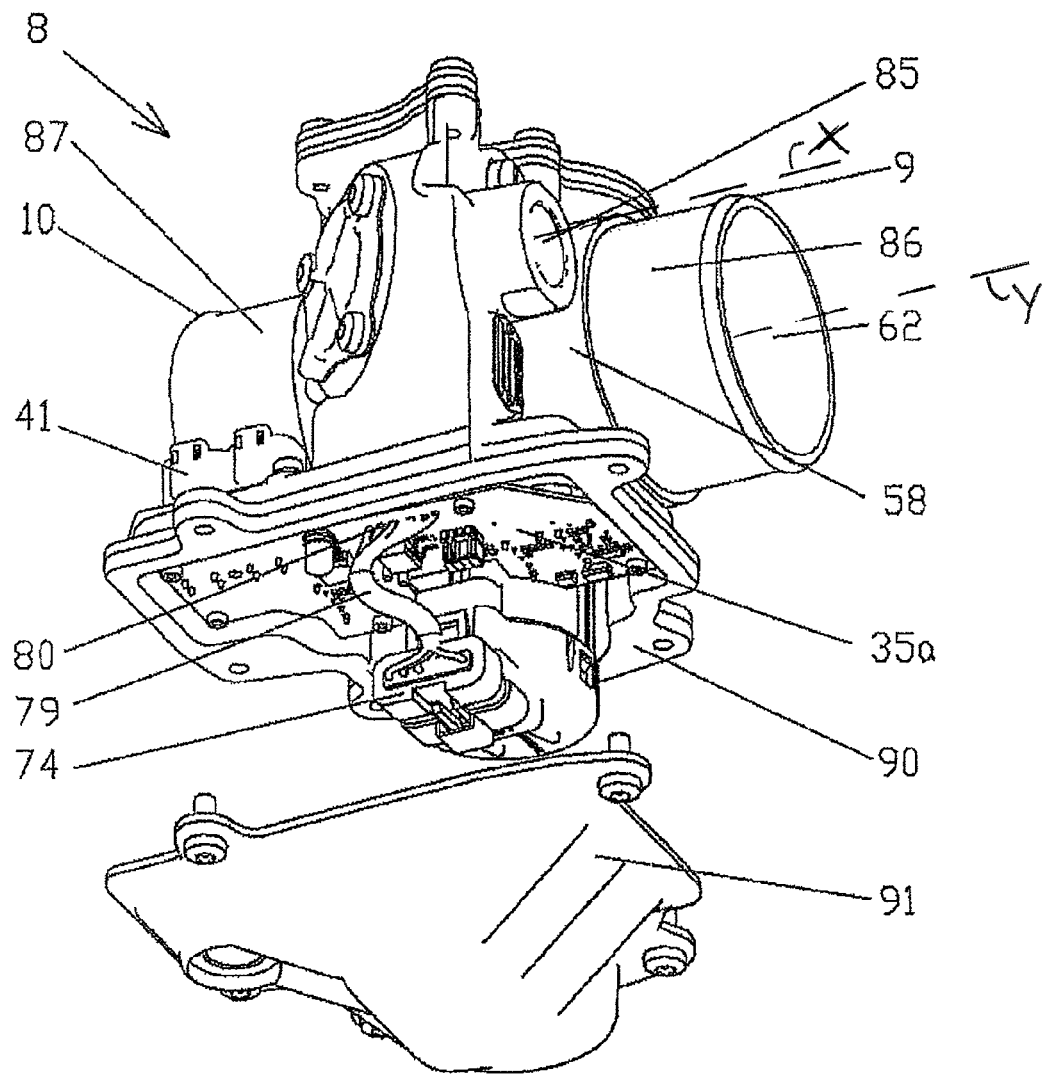
FIG. 3 is a perspective view of the module in a first embodiment.
Figure 4:
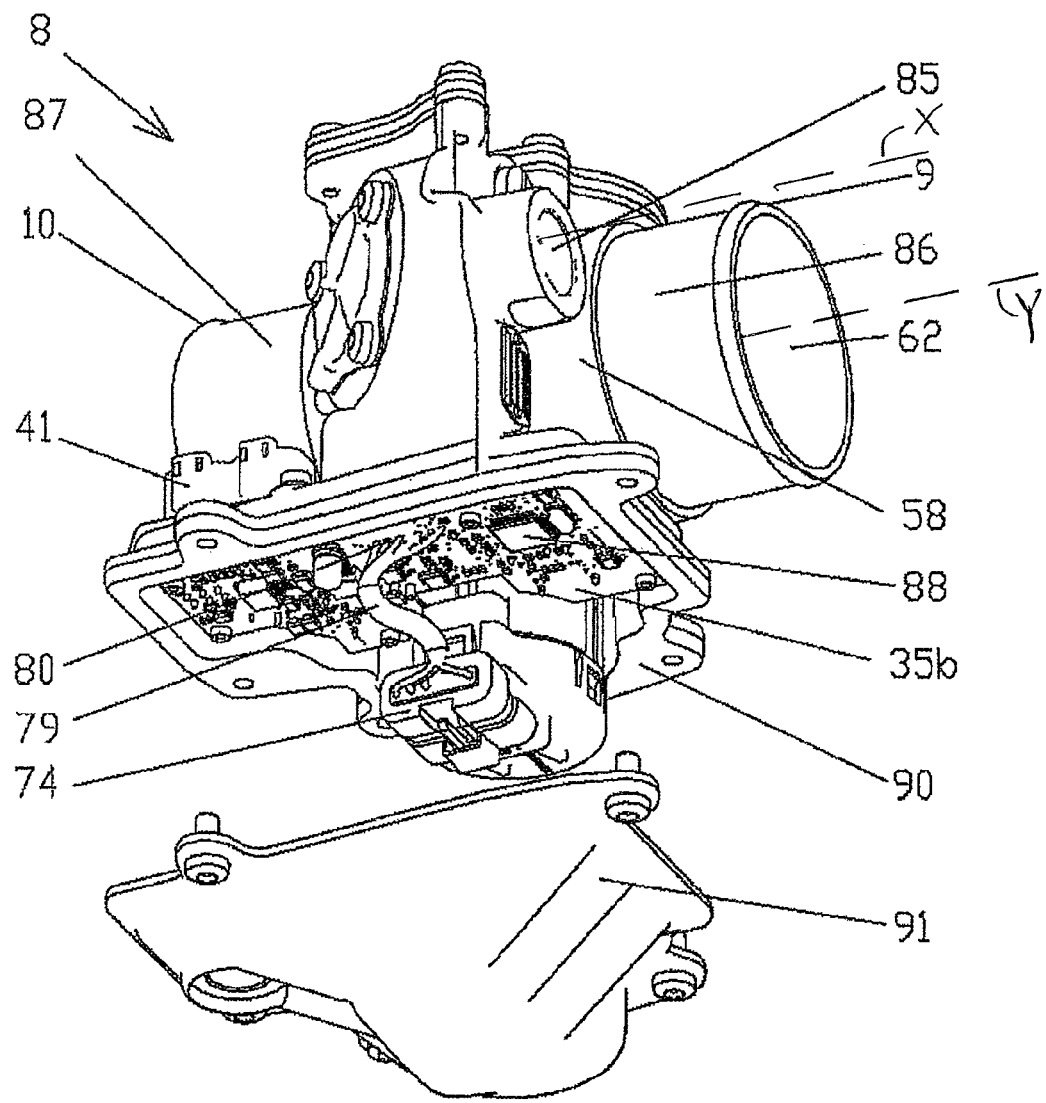
FIG. 4 is a perspective view of the module in a second embodiment.

The exemplary electronic control unit 35 is also formed in a replaceable modular fashion. FIG. 3 and FIG. 4 show two different variants of the device. According to embodiments of the invention, the exemplary control unit 35 may command operation of both adjustment device 66, and the electronic control terminal 69, to adjust flap 60 and regulating device 68, respectively.

In FIG. 3, the lower cover 91 of the connection face 90 of the exemplary housing 89 of the fresh gas line section module 8 is illustrated in the removed state. In this embodiment, the electronic control unit 35a is not equipped with its own computer or software. For example, an interface may be provided to utilize computers, software and electronic systems disposed elsewhere in the vehicle.

In contrast, in FIG. 4 the exemplary electronic control unit 35b is equipped with its own computer 88 and software. The software is stored in the computer 88, for example, via the terminal 41.

Figure 5:
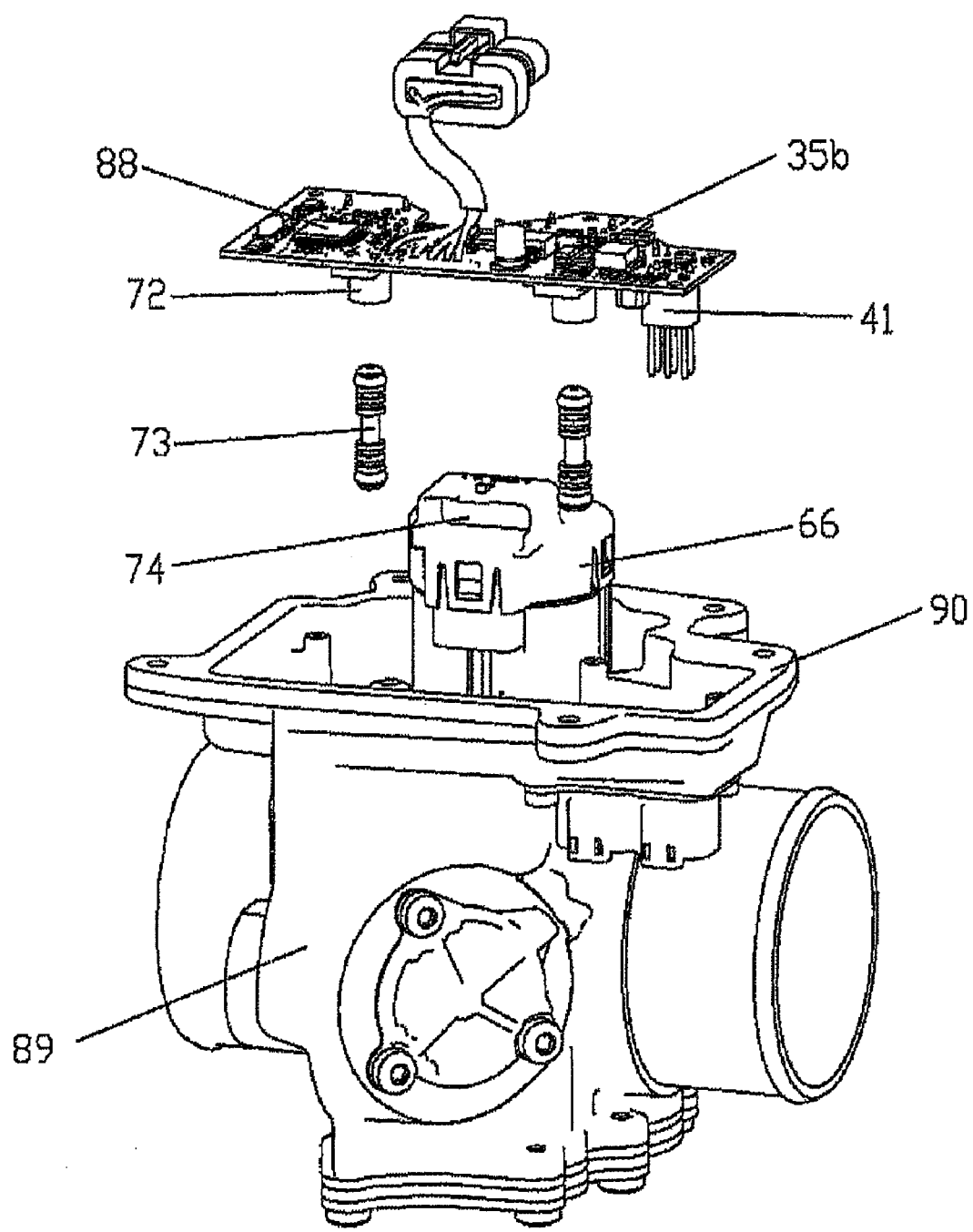
FIG. 5 is a perspective view of the module according to FIG. 4, which is partially in the form of an exploded view.

FIG. 5 shows a further embodiment of the electronic control unit 35b, the latter containing the electrical/electronic pressure sensors 72 and the pressure pickups 73 which are embodied as short pieces of piping, and in this embodiment are attached in the housing 89.

The software of the exemplary computer 88 can be used to coordinate the activation of the valve 70 and of the flap 60. For example, at normal rotational speeds, approximately 30 to 40 ms deceleration occurs during the activation of the flap 60 even though the deceleration during the activation of the valve 70 is only 10 ms. For this reason, the exemplary quantity regulating device 68 of the valve 70 receives precisely one activation pulse if the flap 60 is almost closed, so that additional compressed air additionally flows in only when the flap 60 has just been closed. In order to determine the activation time of the valve 70, the current position of the flap 60 is detected in terms with sensor technology, for example by using the position determining sensor 63, and is processed in the computer 88.

At lower rotational speeds, the quantity regulating device 68 of the valve 70 receives its activation pulse earlier compared to the operating conditions described above, so that some additional compressed air can still flow back through the line 11 in the direction of the turbocompressor 17 and the charge pressure is thus limited.

In a truck or bus, the compressed air may be taken according to an embodiment of the invention from a compressed air vessel 45. The compressed air connection 42 and the line 43 may be part, according to the technical specifications of the brake systems. It is expedient also to form the valve 70 according to these requirements. An electrically activated valve, such as an ABS valve of the brake system may be suitable for this role. An exemplary arrangement in which the compressed air line 43 with the throttle 85 and the interior chamber 57 have a parallel geometric axis (axis X and axis Y, respectively) can be installed in a space-saving fashion in the engine compartment, because there is generally sufficient space available parallel to the line 11.

The exemplary module 8 may be embodied in a modular design for various diesel engine categories. The engines which are manufactured in large series are classified in cubic capacity categories or specific cubic capacity sizes according to which the tax and insurance levels may be selected are built. In engine technology it is customary that the highest speed of the fresh air must not exceed a specific value. Thus, a cubic capacity size has a matching diameter of the fresh gas line. The modular design allows specific diameters to be selected in a stepped fashion for the inflow opening 10 or outflow opening 9. These include diameters which are determined in a stepped fashion for the pipe connections for installation in the line 11. Thus the modular design of the gas supply device according to the invention makes it easy to fit the device as a unit, as needed, to different engines.

Figure 6:
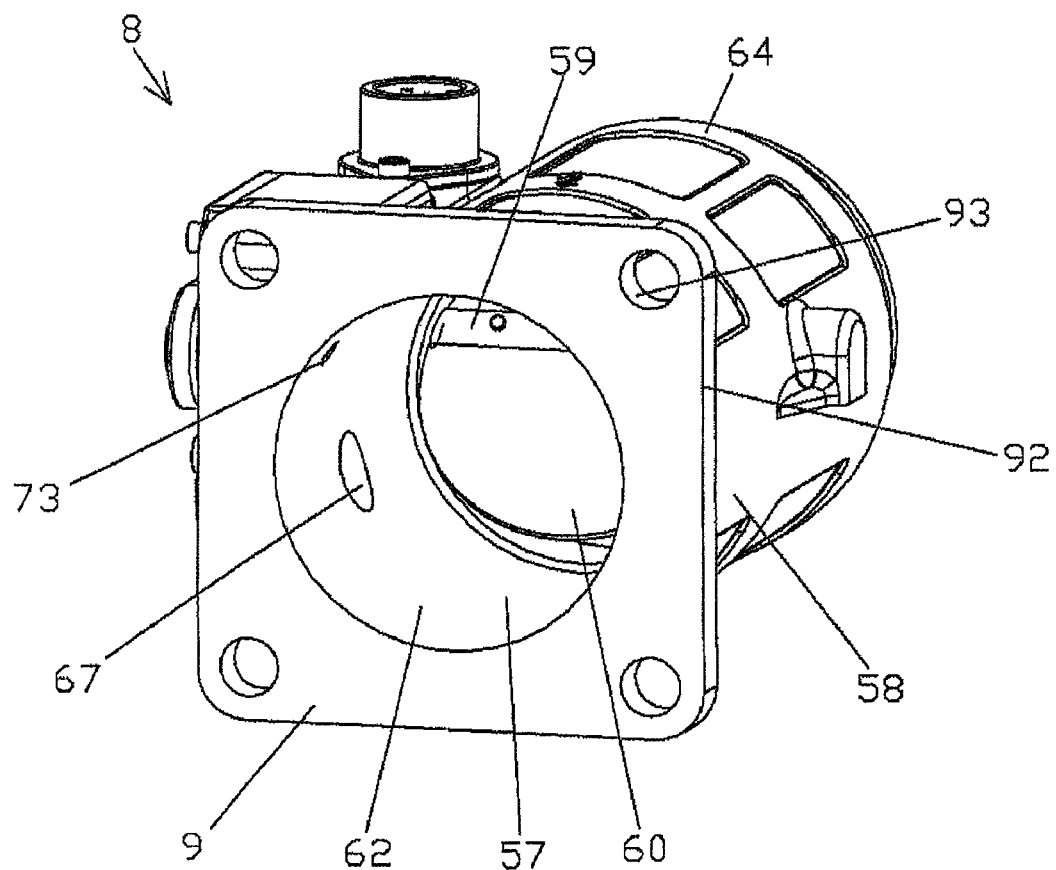
FIG. 6 is a perspective view of a third embodiment of the module.

FIG. 6 shows an exemplary flange variant of the module 8 whose second "outflow" end connection is embodied, in contrast to the two exemplary embodiments described above, as a flange 92 which is formed in one piece onto the housing 89 and is provided with drill holes 93 for attachment screws (not illustrated). The module 8 can be connected by flanges to the collecting line 5 by this system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following reference numerals are provided to increase the clarity of the specification and drawings.
1 Arrangement
2 Piston internal combustion engine
3 Cylinder
4 Intake line
5 Collecting line
6 Cylinder block
7 Connecting flange
8 Fresh gas conduction section module
9 Second "outflow" end connection
10 First "inflow" end connection
11 Line
12 Outflow opening
13 Charge air cooler
14 Inflow opening
15 Line
16 Outflow opening
17 Turbocompressor
18 Inflow opening
19 Air filter
20 Line
21 Shaft
22 Exhaust gas turbocharger
23 Exhaust gas turbine
24 Inflow opening
25 Outflow opening
26 Exhaust collecting pipe
27 Exhaust line
28 Outflow opening
29 Exhaust pipe
30 Injection nozzles
31 Line
32 Terminal
33 Accelerator pedal
34 Terminal
35 Electronic control unit
35a Electronic control unit (without computer)
35b Electronic control unit (with computer)
36 Line
37 Connection
38 Electronic control unit of the diesel engine
39 Terminal
40 Collecting line
41 Terminal
42 Compressed air connection
43 Line
44 Outlet connection
45 Compressed air vessel
46 Feed connection
47 Line
48 Compressed air connection
49 Compressed air compressor
50 Pressure regulator
51 Air dryer
52 Intake connector
53 Air filter
54 Shaft
55 Belt drive
56 Main shaft
57 Interior
58 Wall
59 Shaft
60 Flap
61 Inflow space
62 Outflow space
63 Position determining sensor
64 Outer face
65 Connection
66 Adjustment device
67 Compressed air inflow opening
68 Quantity regulating device
69 Electrical control terminal
70 Valve
71 Connection
72 Pressure pickup
73 Pressure meter
74 Adjustment device terminal
75 Line
76 Connection
77 Line
78 Connection
79 Line
80 Connection
81 Line
82 Connection
83 Line
84 Connection
85 Throttle
86 Line connection
87 Line connection
88 Computer
89 Housing
90 Connection face
91 Cover
92 Flange
93 Drill hole

What is claimed is:

1. A fresh gas supply device for a turbocharged piston internal combustion engine having fresh gas conduction elements, comprising:
a compressed air connection operatively connected to a tubular interior chamber of the fresh gas conduction elements;
a quantity regulating device for continuously regulating additional compressed air into the interior chamber;
an adjustable flap arranged in the interior chamber for continuously regulating a throughflow, the interior chamber being bounded by a first end connection for inflow of charge air from an exhaust gas turbocharger, and by a second end connection for outflow of charge air from the exhaust gas turbocharger, the adjustable flap being adjustable between a fully opened end position and any desired intermediate position between open and closed positions;
a common housing of the fresh gas conduction elements forming a separate module, the common housing defining the first and second end connections as line connections which are in addition also usable as supporting elements for the module, wherein an electrical terminal for an integrated electronic control unit is disposed on an outside surface of the common housing; and
a first pressure pickup having a pressure meter arranged in the tubular interior chamber between the flap and the first end connection, and a second pressure pickup having a pressure meter arranged in the tubular interior chamber between the flap and the second end connection, the first and second pressure pickups being operatively connected to the electronic control unit,
an exchangeable, flow-influencing throttle installable upstream of the quantity regulating device in the common housing,
wherein the adjustable flap is the throughflow regulating flap in the interior chamber of the common housing, the quantity regulating device for the additional compressed air, an adjustment device for the flap and a position determining device assigned thereto are disposed within the common housing, the common housing has a connection face to which a cover is detachably attached, an electronic control unit which at least actuates the quantity regulating device and the adjustment device being arranged under the cover, and the throttle has a geometric axis substantially parallel to a geometric axis of the tubular interior chamber.

2. The fresh gas supply device as claimed in claim 1, wherein both line connections comprise a hose connection adapted for attaching hose lines thereto using clip elements.

3. The fresh gas supply device as claimed in claim 1, wherein both line connections comprise a pipe connection for attaching pipelines thereto using pipe sleeves.

4. The fresh gas supply device as claimed in claim 1, wherein at least one of the line connections comprises a flange for attachment using screws.

5. The fresh gas supply device as claimed in claim 1, further comprising mutual electrical connections for connecting the electrical terminal to the integrated electronic control unit.

6. The fresh gas supply device as claimed in claim 1, wherein the electronic control unit comprises a computer which contains operational and functional software.

7. The fresh gas supply device as claimed in claim 1, wherein the electronic control unit comprises a power electronic system for actuation, and an interface for carrying out control processes using an external engine/vehicle electronic system.

8. The fresh gas supply device as claimed in claim 1, wherein the throttle is installable in a line for delivering the additional compressed air to the quantity regulating device.

9. The fresh gas supply device as claimed in claim 8, wherein the compressed air line containing the throttle has a geometric axis substantially parallel to a geometric axis of the tubular interior chamber.

10. A turbocharged internal combustion engine, comprising:

a modular fresh gas conduction module connectable to intake lines of the engine;

a common housing of the modular fresh gas conduction module; an adjustable flap disposed in an interior chamber defined by the common housing for continuously regulating a fresh gas flow from a turbocharger;

a quantity regulating device for continuously regulating additional compressed air flowing in the interior chamber between the adjustable flap and an outlet thereof;

first and second end connections of the housing, forming a fluid connection between the interior chamber and the intake lines, and supporting the modular fresh gas conduction module on the engine, wherein the adjustable flap is adjustable between a fully closed position of the flap corresponding to an open position of the quantity regulating device, and any desired intermediate position between open and closed positions, wherein the adjustable flap is the throughflow regulating flap in the interior chamber of the common housing, and wherein an electrical terminal for an integrated electronic control unit is disposed on an outside surface of the common housing; and a first pressure pickup having a pressure meter arranged in the tubular interior chamber between the flap and the first end connection, and a second pressure pickup having a pressure meter arranged in the tubular interior chamber between the flap and the second end connection, the first and second pressure pickups being operatively connected to the electronic control unit, an exchangeable, flow-influencing throttle installable upstream of the quantity regulating device in the common housing, wherein the quantity regulating device for the additional compressed air, an adjustment device for the flap and a position determining device assigned thereto are disposed within the common housing, the common housing has a connection face to which a cover is detachably attached, an electronic control unit which at least actuates the quantity regulating device and the adjustment device being arranged under the cover, and the throttle has a geometric axis substantially parallel to a geometric axis of the tubular interior chamber.

11. The internal combustion engine according to claim 10, further comprising a position determining device of the adjustable flap.

12. The internal combustion engine according to claim 10, wherein the housing further contains a position determining device for the adjustable flap.

* * * * *